United States Patent [19]
Soto

[11] Patent Number: 4,988,978
[45] Date of Patent: Jan. 29, 1991

[54] LIQUID LEVEL INDICATOR FOR STORAGE TANKS

[76] Inventor: Wilson F. Soto, 50 Rockaway Pkwy., Brooklyn, N.Y. 11212

[21] Appl. No.: 503,256

[22] Filed: Apr. 2, 1990

[51] Int. Cl.⁵ .............................................. G08B 21/00
[52] U.S. Cl. ................................. 340/624; 200/84 R; 137/558; 73/307; 73/319; 116/110; 116/228
[58] Field of Search .......................... 340/623–625; 200/84 R, 84 B; 73/305, 307, 308, 313, 314, 317, 319, 315; 137/399, 409, 411, 558; 4/314, 331, 381, 382, 383, 395–397, 399–401; 141/94, 95, 192, 199, 200–205, 210–216, 218–224, 227–229

[56] References Cited

U.S. PATENT DOCUMENTS

| 869,907 | 11/1907 | Jarvis | 137/411 |
|---|---|---|---|
| 1,188,822 | 6/1916 | Peters | 200/84 R |
| 1,647,806 | 11/1927 | McLain et al. | 73/307 |
| 3,359,798 | 12/1967 | Katselis | 340/623 |
| 3,374,326 | 3/1968 | Eisendrath | 200/84 R |
| 3,412,609 | 11/1968 | Kaletka et al. | 340/623 |
| 4,398,186 | 8/1983 | Statz | 73/308 |
| 4,499,615 | 2/1985 | Radovsky | 4/396 |

FOREIGN PATENT DOCUMENTS 0505784 9/1951 Belgium ............................ 340/624
0309517 9/1929 United Kingdom ................. 4/400

Primary Examiner—Joseph A. Orsino
Assistant Examiner—Jill Jackson
Attorney, Agent, or Firm—Goodman & Teitelbaum

[57] ABSTRACT

A liquid level indicator for storage tanks including a cover member for covering an opening at the top of the storage tank, a central rod extending downwardly from the cover member into the storage tank, and a float movably disposed on the central rod. A vertically movable first rod assembly is connected to an upper portion of the central rod, and a vertically movable second rod assembly is connected to a lower portion of the central rod, with the float being disposed therebetween so that the float contacts and moves the first rod assembly when the storage tank is substantially filled, and the float contacts and moves the second rod assembly when the storage tank is near empty. Switches are associated with each of the first and second rod assemblies to activate signal members when either of the first and second rod assemblies are vertically moved to indicate when the storage tank is substantially filled or when the storage tank is near empty. Such signal members can include colored light bulbs, for example, a red light bulb to indicate that the storage tank is substantially filled, and a yellow light bulb to indicate the storage tank is near empty.

18 Claims, 2 Drawing Sheets

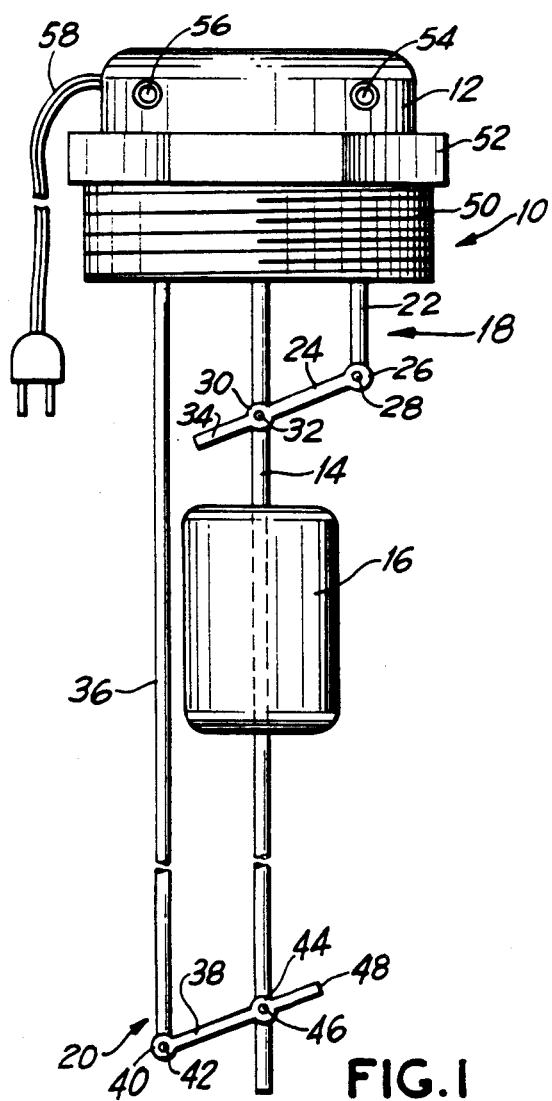
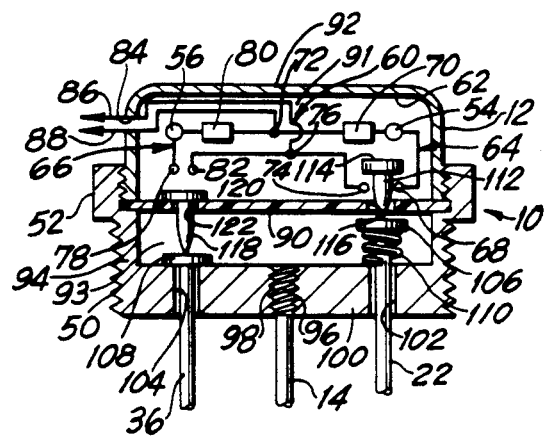
FIG.1
FIG.2

LIQUID LEVEL INDICATOR FOR STORAGE TANKS

BACKGROUND OF THE INVENTION

This invention relates to an indicator and, more particularly, to a liquid level indicator for storage tanks to indicate when the liquid in the storage tank has substantially reached the rim or top portion of the storage tank when filling the storage tank with the liquid, and also to indicate when the liquid is at or near a low level in the storage tank so that the storage tank can be refilled with the liquid.

The use of liquid level indicators is well known in the art, where such indicators can be used in storage tanks, such as fuel oil storage tanks, in domestic, commercial and industrial fields. These indicators alert the person filling the storage tank at the time when the storage tank is filled, thereby preventing the liquid from spilling on the basement floor, on sidewalks and on streets and, accordingly, thus avoid foul odors, hazardous fumes, accidents, fires and the like which can be caused by the spilled liquid. Furthermore, these indicators alert the owner or person in charge of the storage tank when the liquid in the storage tank is at or near a low level so that the storage tank can be refilled without an interruption in the drawing of the liquid from the storage tank. Accordingly, these indicators reduce human errors and compensate for the inexperience of the person filling the storage tank.

U.S. Pat. No. 1,838,135 discloses a high low gravity tank alarm float to indicate both a high level and a low level of the liquid in the tank, where a float moves up and down on a rod to contact either an upper stop or a lower stop secured to the rod Accordingly, when the float contacts either of the stops on the rod, the float moves the contacted stop which thus moves the rod either upwardly or downwardly to activate an operating bar which is connected to an electrical switch arrangement to give a signal when the level of the liquid in the tank is above or below the predetermined levels.

U.S. Pat. No. 3,646,293 discloses an electrical signal generator and a liquid level indicator associated therewith to indicate different levels of the liquid in a tank. A float is mounted on a tube for up and down movement thereof, where magnets are carried within the float to activate stationary switches which are mounted at predetermined levels within the tube in order to produce pulses to indicate the different levels of the liquid in the tank, where the switches are connected to an electrical system to indicate the particular position of the float at each time a particular switch is activated.

SUMMARY OF THE INVENTION

It is accordingly an object of the present invention to provide a liquid level indicator for storage tanks which avoids the disadvantages of the prior art liquid level indicators.

Another object of the present invention is to provide a liquid level indicator for storage tanks which can operate in the same manner in storage tanks of various sizes, and which can function in different types or grades of liquid, such as in fuel oil storage tanks of various sizes, and in fuel oil of different grades.

A further object of the present invention is to provide a liquid level indicator for storage tanks which has a sturdy construction, is simple to operate, and is easy to service when required.

Another object of the present invention is to provide a liquid level indicator for storage tanks which is inexpensive to manufacture and maintain.

Still another object of the present invention is to provide a liquid level indicator for storage tanks which decreases the likelihood of liquid spills by inexperienced or careless persons when filling the storage tank with the liquid.

A further object of the present invention is to provide a liquid level indicator for storage tanks which indicates when the storage tank is substantially filled with the liquid, and also indicates when the liquid in the storage tank is at or near a low level.

Another object of the present invention is to provide a liquid level indicator for storage tanks including a float movably mounted on a rod for up and down movement thereof, and means to indicate when the float is in its upper and lower positions.

And yet another object of the present invention is to provide a liquid level indicator for storage tanks as described above, wherein the indicating means include vertically moving rod assemblies which are moved by the float, the rod assemblies being associated with switch means to activate signals for indicating the substantially filled and near empty conditions of the storage tank.

Briefly, in accordance with the present invention, there is provided a liquid level indicator for storage tanks including a cover member for covering an opening at the top of the storage tank, a central rod extending downwardly from the cover member into the storage tank, and a float movably disposed on the central rod. Vertically movable first rod means are connected to an upper portion of the central rod, and vertically movable second rod means are connected to a lower portion of the central rod, with the float being disposed therebetween so that the float contacts and moves the first rod means when the storage tank is substantially filled, and the float contacts and moves the second rod means when the storage tank is near empty. Switch means are associated with each of the first and second rod means to activate signal means when either of the first and second rod means are vertically moved to indicate when the storage tank is substantially filled or when the storage tank is near empty. Such signal means can include colored light bulbs, for example, a red light bulb to indicate that the storage tank is substantially filled, and a yellow light bulb to indicate that the storage tank is near empty.

BRIEF DESCRIPTION OF THE DRAWINGS

With the above and additional objects and advantages in view, as will hereinafter appear, this invention comprises the devices, combinations, and arrangements of parts hereinafter described by way of example and illustrated in the accompanying drawings of a preferred embodiment in which:

FIG. 1 is a side view of a liquid cover indicator for storage tanks in accordance with the present invention;

FIG. 2 is a fragmented cross-sectional view of the cover member shown in FIG. 1;

In the various figures of the drawings like reference characters designate like parts.

DESCRIPTION OF THE PREFERRED EMBODIMENT

Figure 3:
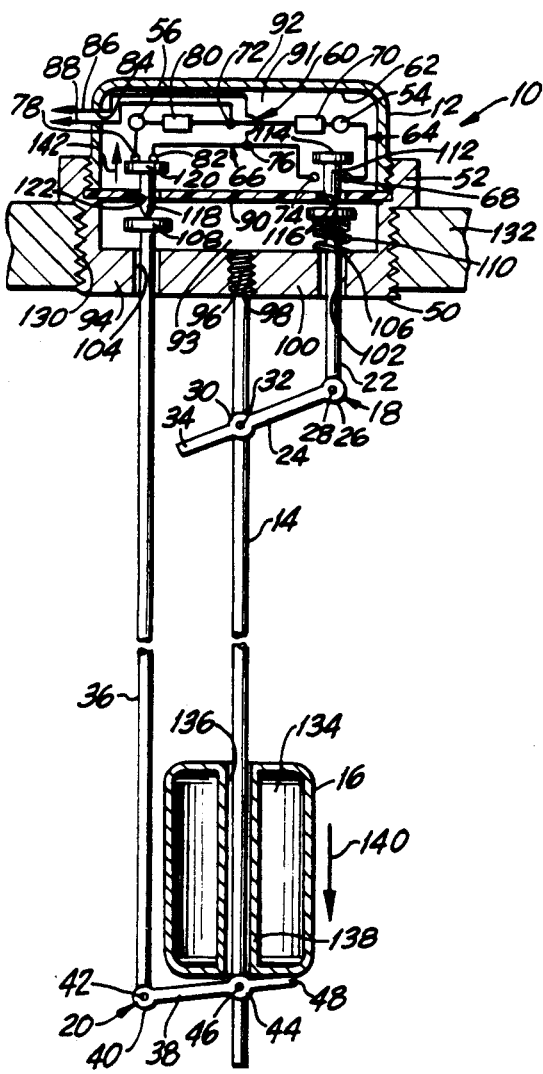
FIG. 3 is a fragmented cross-sectional view of the liquid level indicated when the storage tank is in a near empty condition.

Referring now to the drawings, FIG. 1 shows a liquid level indicator 10 for storage tanks in accordance with the present invention. The indicator 10 includes a cover member 12 for covering an opening in the top of a storage tank. A central rod 14 extends downwardly from the cover member 12 for placement in the storage tank. A float 16 is movably disposed on the central rod 14. Additionally, a first rod assembly 18 extends downwardly from the cover member 12, and also a second rod assembly 20 extends downwardly from the cover member 12, the first rod assembly 18 being on one side of the central rod 14 and the second rod assembly 20 being on the opposite side of the central rod 14.

The first rod assembly 18 includes a vertically disposed rod 22 and a substantially horizontally inclined bar 24. The upper end 26 of the bar 24 is pivotally connected to a bottom end portion of the rod 22 by a pin 28. An intermediate portion 30 of the bar 24 is pivotally connected to an upper portion of the central rod 14 by a pin 32. The lower free end 34 of the bar 24 extends downwardly from the central rod 14, the function of which will be set forth below.

The second rod assembly 20 includes a vertically disposed rod 36 and a substantially horizontally inclined bar 38. The lower end 40 of the bar 38 is pivotally connected to a bottom end portion of the rod 36 by a pin 42. The intermediate portion 44 of the bar 38 is pivotally connected to a lower portion of the central rod 14 by a pin 46. The upper free end 48 of the bar 38 extends upwardly from the central rod 14, the function of which will be set forth below.

The central rod 14 and the rods 22 and 36 disposed on opposite sides thereof, are all parallel to each other, where the rod 22 is shorter than the rod 36. Accordingly, the float 16 is disposed and captured between the bars 24 and 38, where the function of the float 16 will be set forth below.

The cover member 12 is provided with threads 50 on the lower portion thereof for threading into the threaded opening in the top of the storage tank. A noncircular enlarged head portion 52 is provided above the threads 50 in order to tighten the cover member 12 into the opening in the top of the storage tank, where the head portion 52 is received in a conventional tool, such as a wrench, for tightening same. A pair of light bulbs 54, 56 extend through the cover member 12 in order to provide a signal in the manner set forth below. Preferably, the light bulb 54 has a red color to indicate that the storage tank is substantially filled, and the light bulb 56 preferably has a yellow color to indicate that the storage tank is near empty. An electrical power cord 58 is connected to an electrical circuit arrangement 60 disposed within a housing 62 provided in the cover member 12, as shown in FIG. 2.

The electrical circuit arrangement 60, shown in FIG. 2, includes a first electrical circuit 64 having the light bulb 54 therein, and a second electrical circuit 66 having the light bulb 56 therein. Terminal 68 of electrical circuit 64 is connected in series with the light bulb 54, an electrical component 70 which will be explained below, and point 72. The other associated terminal 74 is connected in series with the point 76. Similarly, the terminal 78 of the second electrical circuit 66 is connected in series with the light bulb 56, an electrical component 80 and the point 72. The other associated terminal 82 of the second electrical circuit 66 is connected to the point 76. The points 72 and 76 lead out of the housing 62 through the opening 84 in the cover member 12 by the electrical lines 86, 88 which form the above-mentioned power cord 58. The function of the electrical circuit arrangement 60 will be discussed below.

A horizontal partition 90, preferably fabricated from a plastic-like material, is provided in the housing 62 to form an upper compartment 91 within the upper casing 92 of the cover member 12 for housing the electrical circuit arrangement 60, and a lower compartment 93 within the lower casing 94 of the cover member 12. The upper end of the central rod 14 is provided with threads 96 for a fixed threaded engagement in a threaded opening 98 provided in the bottom wall 100 of the lower casing 94 of the cover member 12. On opposite sides of the threaded hole 98, additional unthreaded holes 102 and 104 are provided through the bottom wall 100 of the lower casing 94. The upper and lower casings 92, 94 are preferably threadedly secured together with the partition 90 being sandwiched therebetween.

The upper end portion of the rod 22 extends through the hole 102, and the upper end portion of the rod 36 extends through the hole 104. An enlarged head 106 is provided at the top end of the rod 22, and an enlarged head 108 is provided at the top end of the rod 36. The heads 106, 108 are captured within the lower compartment 93 so that the rods 22 and 36 cannot be detached from the cover member 12.

A coil spring 110 is disposed between the head 106 and the bottom wall 100 of the cover member 12 so that the head 106 of the rod 22 is normally spaced from the bottom wall 100 of the cover member 12, however, the head 106 of the rod 22 can be pulled downwardly by the rod 22 against the action of the spring 110 towards the bottom wall 100 of the cover member 12. When the downward force on the rod 22 is removed, the spring 110 will return the head 106 upwardly to its normal position. The head 108 of the rod 36 normally rests on the bottom wall 100 of the cover member 12. However, when the rod 30 is pushed upwardly, the head 108 thereon will also move upwardly away from the bottom wall 100 of the cover member 12. When the upward force on the rod 30 is removed, the head 108 thereon will move back to its normal position on the bottom wall 100 of the cover member 12.

A contact pin 112 having an enlarged head 114 extends through a hole 116 in the partition 90 so that the pointed free end of the contact pin 112 rests on the head 106 of the rod 22, and the enlarged head 114 is disposed above the terminals 68, 74 of the first electrical circuit 64. The enlarged head 114 is fabricated from an electrically conductive material such as metal, and the remaining pin portion of the contact pin 112 is preferably, but not necessarily, fabricated from a plastic-like material. The length of the pin portion of the contact pin 112 is predetermined so that when the head 106 of the rod 22 is pulled downwardly to its lowest position, the enlarged head 114 will contact the terminals 68, 74 of the first electrical circuit 64, as set forth below.

A second contact pin 118 having an enlarged head 120 extends through a hole 122 in the partition 90 so that the pointed free end of the contact pin 118 rests on the head 108 of the rod 36, and the enlarged head 120 is disposed below the terminals 78, 82 of the second electrical circuit 66. Though the enlarged head 120 is shown resting on the partition 90, the enlarged head 120 can also be positioned slightly above the partition 90 as long as the enlarged head 120 is below the terminals 78, 82. The enlarged head 120 is fabricated from an electrically conductive material such as metal, and the remaining pin portion of the contact pin 118 is preferably, but not necessarily, fabricated from a plastic-like material. The length of the pin portion of the contact pin 118 is also predetermined so that when the head 108 of the rod 36 is pushed upwardly to its highest position, the enlarged head 120 will contact the terminals 78, 82 of the second electrical circuit 66, as set forth below. It is noted, that the electrical circuit arrangement 60 and the contact pins 112, 118 could be manufactured as a micro switch to function in the manner set forth below.

Figure 4:
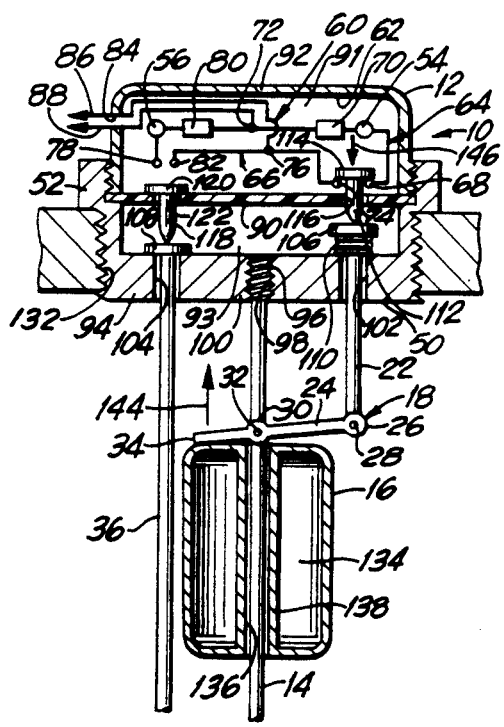
FIG. 4 is a fragmented cross-sectional view of the liquid level indicator when the storage tank is in a substantially filled condition.

Referring to FIGS. 3 and 4, the operation of the liquid level indicator 10 of the present invention will now be discussed. Accordingly, the indicator 10 is inserted into the storage tank, and the cover member 12 is threaded into the threaded opening 130 provided in the top 132 of the storage tank through which the indicated 10 was inserted. The longitudinal lengths of the central rod 14 and the long rod 36 will vary according to the size of the storage tank so that the lower ends of the central rod 14 and the long rod 36 are at the bottom of the storage tank. Preferably, the indicator 10 is used in fuel oil storage tanks of various sizes, for fuel oil of different grades. The power cord 58 is now plugged into a conventional electrical power supply in the usual manner.

FIG. 3 shows the position of the float 16 when the storage tank is near empty. The storage tank 16 has a hollow interior 134. The float opening 136 receiving the central rod 14 therethrough is partitioned by a longitudinally extending core member 138 so that the liquid cannot enter the hollow interior 134 of the float 16, thus enabling the float 16 to float on the liquid.

When the float 16 is moved downwardly in the direction of the arrow 140 when the storage tank is near empty, the float 16 engages the upper free end 48 of the bar 38, and the weight of the float 16 pushes downwardly on the free end 48 to pivot the bar 38 about the pin 46 to thus pivot the opposite lower end 40 of the bar 38 upwardly. This action causes the lower end 40, which is pivotly connected to the rod 36, to push the rod 36 also upwardly. As the rod 36 moves upwardly, the head 108 thereon also moves upwardly, so that the head 108 moves the contact pin 118 resting thereon also upwardly in the direction of the arrow 142 until the enlarged head 120 of the contact pin 118 engages and makes contact between the terminals 78, 82 of the second electrical circuit 66. The enlarged head 120 causes an electrical current to flow between the terminals 78, 82, thus activating the second electrical circuit 66.

Accordingly, when the second electrical circuit 66 is activated, the light bulb 56 is energized to signal that the storage tank is near empty. As the same time, the electrical component 80 is also energized. It is noted, that the electrical component 80 can have many different functions, such as deactivating the second electrical circuit 66 after a predetermined time period so that the light bulb 56 is deenergized, such as providing an audio signal when the storage tank is near empty, and such as functioning as a transmitter to activate a receiver remotely positioned from the indicator 10 and including signal means such as a light bulb and/or an audio device to indicate that the storage tank is near empty.

When the near empty storage tank is being filled with the liquid, the float 16 disposed on the liquid will move upwardly so that the bar 38 and rod 36 will pivot back to their normal position as shown in FIG. 1. When the head 108 of the rod 36 moves back to its normal position on the bottom wall 100 of the cover member 12, the contact pin 118 will also move back to its normal lower position as shown in FIG. 2, thus breaking the electrical connection between the terminals 78, 82 and deactivating the second electrical circuit 66.

Continued filling of the storage tank with the liquid, causes the float 16 to move upwardly in the direction of the arrow 144 until the storage tank is substantially filled, as indicated in FIG. 4. The float 16 now engages the lower free end 34 of the bar 24, and the buoyant force of the float 16 pushes upwardly on the free end 34 to pivot the bar 24 about the pin 32 to thus pivot the opposite higher end 26 of the bar 24 downwardly. This action causes the upper end 26, which is pivotly connected to the rod 22, to pull the rod 22 downwardly against the action of the spring 110. As the rod 22 moves downwardly, the head 106 thereon also moves downwardly against the spring 110, so that the contact pin 112 resting on the head 106 also moves downwardly in the direction of the arrow 146 until the enlarged head 114 of the contact pin 112 engages and makes contact between the terminals 68, 74 of the first electrical circuit 64. The enlarged head 114 causes an electrical current to flow between the terminals 68, 74, thus activating the first electrical circuit 64.

Accordingly, when the first electrical circuit 64 is activated, the light bulb 54 is energized to signal that the storage tank is substantially filled. At that time, the electrical component 70 is energized. It is noted, that the electrical component 70 would have the same or similar functions a the above-mentioned electrical component 80, such as deactivating the first electrical circuit 64 after a predetermined time period so that the light bulb 54 is deenergized, such as providing an audio signal when the storage tank is substantially filled, and such as functioning as a transmitter to activate a receiver remotely positioned from the indicator 10 and including signal means such as a light bulb and/or an audio device to indicate that the storage tank is substantially filled.

When the level of the liquid in the storage tank is then lowered during the discharge of the liquid from the storage tank, the float 16 disposed on the liquid will again move downwardly so that the bar 24 and the rod 22 will pivot back to their normal position as shown in FIG. 1. When the head 106 of the rod 22 moves back to its normal position by the upward force of the spring 110, the contact pin 112 will also move upwardly back to its normal higher position as shown in FIG. 2, thus breaking the electrical connection between the terminals 68, 74 and deactivating the first electrical circuit 64. The above-mentioned operations of the indicator 10 are repeated over and over again during the discharging and filling of the storage tank with the liquid.

Numerous alterations of the structure herein disclosed will suggest themselves to those skilled in the art. However, it is to be understood that the present disclosure relates to a preferred embodiment of the invention which is for the purpose of illustration only, and is not to be construed as a limitation of the invention.

What is claimed is:

1. A liquid level indicator for storage tanks to indicate when the storage tank is substantially filled with a liquid and when the storage tank is near empty, said indicator comprising:
   a cover member for covering an opening in a top portion of the storage tank, said cover member including a housing;
   signal means for indicating when the storage tank is substantially filled with the liquid and when the storage tank is near empty;
   switch means disposed within said housing of said cover member for activating said signal means;
   a central rod extending downwardly from said cover member into the storage tank, said central rod being secured to said cover member in a fixed non-movable relationship therebetween;
   vertically movable first rod means extending from said housing of said cover member into the storage tank on one side of said central rod for activating said switch means when the storage tank is substantially filled with the liquid;
   vertically movable second rod means extending from said housing of said cover member into the storage tank on an opposite side of said central rod for activating said switch means when the storage tank is near empty; and
   a float movably disposed on said central rod for floating on the liquid so that said float moves vertically along said central rod in response to level of the liquid, said float contacting and moving said first rod means when the storage tank is substantially filled with the liquid, and said float contacting and moving said second rod means when the storage tank is near empty.

2. A liquid level indicator according to claim 1, wherein said first rod means is connected to an upper portion of said central rod at a first position, said second rod means being connected to a lower portion of said central rod at a second position, and said float being disposed between said first and second positions.

3. A liquid level indicator according to claim 2, wherein said first rod means includes a first rod and a first bar, said first bar being pivotally connected to an end portion of said first rod and also being pivotally connected to said central rod at said first position.

4. A liquid level indicator according to claim 3, wherein said second rod means includes a second rod and a second bar, said second bar being pivotally connected to an end portion of said second rod and also being pivotally connected to said central rod at said second position.

5. A liquid level indicator according to claim 4, wherein an upper end portion of said central rod is threadedly engaged in a bottom wall of said cover member.

6. A liquid level indicator according to claim 4, wherein said first rod is shorter than said second rod, said first and second rods both being disposed parallel to said central rod.

7. A liquid level indicator according to claim 4, wherein a free end of said first bar extends downwardly from said central rod so that said float contacts said free end of said first bar to pivot said first bar to force said first rod vertically downwardly when the storage tank is substantially filled with the liquid.

8. A liquid level indicator according to claim 7, wherein an electrical circuit of said switch means is activated when said first rod is moved vertically downwardly.

9. A liquid level indicator according to claim 7, wherein a free end of said second bar extends upwardly from said central rod so that said float contacts said free end of said second bar to pivot said second bar to force said second rod vertically upwardly when the storage tank is near empty.

10. A liquid level indicator according to claim 9, wherein an electrical circuit of said switch means is activated when said second rod is moved vertically upwardly.

11. A liquid level indicator according to claim 10, wherein a second electrical circuit of said switch means is activated when said first rod is moved vertically downwardly.

12. A liquid level indicator according to claim 1, wherein said switch means includes a first electrical circuit associated with said first rod means for actuation thereof, and also includes a second electrical circuit associated with said second rod means for actuation thereof.

13. A liquid level indicator according to claim 12, wherein said signal means includes a first light bulb associated with said first electrical circuit and a second light bulb associated with said second electrical circuit, said first light bulb having a different color than said second light bulb.

14. A liquid level indicator according to claim 13, wherein said first and said second light bulbs extend through said cover member to an outer surface in order to be visible.

15. A liquid level indicator according to claim 1, wherein an upper end portion of said central rod is threadedly engaged in a bottom wall of said cover member.

16. A liquid level indicator according to claim 15, wherein said first rod means includes a first rod movably extending through an opening in said bottom wall of said cover member, and said second rod means includes a second rod movably extending through another opening in said bottom wall of said cover member, said first and second rods both being parallel to said central rod.

17. A liquid level indicator according to claim 16, wherein a first bar is pivotally connected between an upper portion of said central rod and a lower portion of said first rod, and a second bar is pivotally connected between a lower portion of said central rod and a lower portion of said second rod.

18. A liquid level indicator according to claim 17, wherein said float is disposed between said first and second bars

* * * * *